United States Patent [19]

Brown et al.

[11] Patent Number: 5,574,083
[45] Date of Patent: Nov. 12, 1996

[54] AROMATIC POLYCARBODIIMIDE CROSSLINKERS

[75] Inventors: Ward T. Brown; James C. Day, both of North Wales, Pa.

[73] Assignee: Rohm and Haas Company, Philadelphia, Pa.

[21] Appl. No.: 235,585

[22] Filed: Apr. 29, 1994

Related U.S. Application Data

[63] Continuation-in-part of Ser. No. 75,448, Jun. 11, 1993, abandoned.

[51] Int. Cl.$^6$ ............ C07C 267/00; C07C 271/32; C08G 18/00; C08L 75/04; C08K 5/13; C08K 5/29; C08K 5/16; C08K 5/32
[52] U.S. Cl. ............ 524/186; 252/182.23; 252/182.24; 252/182.26; 252/182.27; 252/182.28; 252/182.29; 524/259; 524/323; 524/351; 524/352; 524/589; 524/591; 524/714; 524/765; 524/839; 524/871; 560/26; 564/252; 528/44; 528/49; 528/51; 528/52; 528/48; 528/76; 528/80
[58] Field of Search ............ 564/252; 252/182.23; 252/182.24, 182.26, 182.27, 182.28, 182.29; 524/871, 259, 714, 765, 323, 351, 352, 186, 259, 589, 591, 839; 528/44, 51, 76, 80, 49, 52, 48; 560/26

[56] References Cited

U.S. PATENT DOCUMENTS

| | | | |
|---|---|---|---|
| 2,853,473 | 9/1958 | Campbell et al. | 528/51 |
| 2,941,983 | 6/1960 | Smeltz | 528/49 |
| 3,226,368 | 12/1965 | Reischl et al. | 528/51 |
| 3,267,137 | 8/1966 | Fischer | 528/44 |
| 3,450,562 | 6/1969 | Hoeschele | 428/425.1 |
| 3,909,333 | 9/1975 | Eastman | 156/332 |
| 3,929,733 | 12/1975 | Alberino et al. | 528/67 |
| 4,048,128 | 9/1977 | Eastman | 524/147 |
| 4,076,945 | 2/1978 | Elmer | 528/44 |
| 4,612,054 | 9/1986 | Hamon | 528/274 |
| 4,910,339 | 3/1990 | Henning et al. | 528/84 |
| 4,977,219 | 12/1990 | Watson, Jr. | 528/274 |
| 5,104,928 | 4/1992 | Craun et al. | 524/773 |
| 5,117,059 | 5/1992 | Tylor | 564/252 |
| 5,126,422 | 6/1992 | Halpaap et al. | 528/45 |
| 5,173,528 | 12/1992 | Chiolle et al. | 524/87 |
| 5,246,993 | 9/1993 | Scherzer et al. | 528/51 |
| 5,258,481 | 11/1993 | Hesselmans et al. | 528/28 |
| 5,264,518 | 11/1993 | Amano | 528/44 |
| 5,357,021 | 10/1994 | Tye et al. | 528/59 |

FOREIGN PATENT DOCUMENTS

| | | |
|---|---|---|
| 241805 | 10/1987 | European Pat. Off. . |
| 277361 | 8/1988 | European Pat. Off. . |
| 507407 | 10/1992 | European Pat. Off. . |
| 1056202 | 1/1967 | United Kingdom . |

*Primary Examiner*—James J. Seidleck
*Assistant Examiner*—Rabon Sergent
*Attorney, Agent, or Firm*—Ronald D. Bakule, Patent Agent

[57] ABSTRACT

Disclosed are certain aromatic polycarbodiimides. Also disclosed is the use of an aromatic polycarbodiimide containing only aromatic carbodiimide groups as a cross-linker for a coating binder polymer bearing carboxyl groups.

1 Claim, No Drawings

AROMATIC POLYCARBODIIMIDE CROSSLINKERS

This application is a Continuation-in-part of U.S. Ser. No. 08/075,448, filed Jun. 11, 1993, and entitled "AROMATIC POLYCARBODIIMIDE CROSSLINKERS" now abandoned.

The present invention relates to a carbodiimide cross-linker. In particular, the present invention relates to an aromatic polycarbodiimide cross-linker and its use in a film forming coating formulation, in particular its use in an aqueous coating formulation. Film forming coating formulations include paints, sealants, nonwoven fabric binders, leather coatings, and adhesives.

BACKGROUND OF THE INVENTION

The process of film formation is fairly well understood in the coatings industry and details on the process may be found in "Organic Film Formers" in *Paint and Surface Coatings*, by J. Bentley (R. Lambourne (Editor), John Wiley and Sons, New York, N.Y., 1987). In particular, in film formation technology, it is known that the addition of a cross-linker to a film forming coating formulation can improve certain important properties of the formed coating, such as its hardness, solvent resistance and mar resistance. However, it is desirable to have a crosslinking mechanism which is operative during or after film formation. If the cross-linking mechanism has proceeded materially before film formation has been substantially completed, the overall film formation process will be compromised and the resultant film will be weak and porous with the result that the protective functions of the film will be severely impaired. In some applications heat may be used to assist crosslinking after film formation is complete. However, in many cases, heat is not available so the crosslinking mechanism is desirably triggered under ambient conditions before film formation is complete.

An example of a known good performance cross-linker for coating formulations is a product sold under the trade name of XAMA-7 (supplied by EIT Inc). XAMA-7 essentially consists of three connected aziridine groups. While XAMA-7 displays good cross-linking performance it does suffer from an important draw back. It is very toxic. It therefore has to be handled with the utmost of care. This is clearly undesirable.

However, not all commercial cross-linkers are as toxic as the aziridine based products. For example, carbodiimides having the general structural formula of r-N=C=N-r', wherein at least r' is an aliphatic group, have been used as cross-linkers. In this regard, U.S. Pat. No. 4,977,219, EP-A-0,277,361 and EP-A-0,241,805 disclose aliphatic polycarbodiimide cross-linkers, wherein both r and r' are aliphatic groups. EP-A-0277361 discloses a mixed aliphatic and aromatic polycarbodiimide cross-linker, wherein r is an aromatic group and r' is an aliphatic group. Even though these aliphatic polycarbodiimide cross-linkers are used commercially, they do suffer from certain draw backs. In particular, crosslinking is too facile with the result that the cross-linking mechanism is substantially completed before film formation is completed. Therefore, despite the fact that a rapid cross-linking step will generally lead to an increase in crosslink density and possibly to improvements in solvent resistance, it detracts from the process of film formation. For example, there is a decrease in the important property of mar resistance. The rapid cross-linking therefore leads to the formation of generally poor and brittle coatings as they are not well-knitted.

The present invention seeks to overcome the problems associated with the prior art cross-linkers. In particular, the present invention seeks to provide a relatively non-toxic cross-linker having a good performance in coatings, in particular aqueous coatings.

According to a first aspect of the present invention there is provided a method of crosslinking a coating binder polymer bearing at least two carboxylic acid groups by admixing an aromatic polycarbodiimide which contains only aromatic carbodiimide groups.

According to a second aspect of the present invention there is provided an aromatic polycarbodiimide having the general formula of either

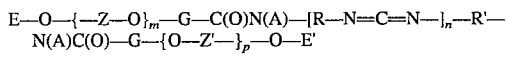

or

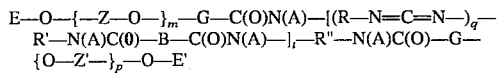

wherein m is an integer of from 1 to 15, preferably 1 to 10, more preferably 5 to 10, most preferably 7; n is an integer of from 2 to 15, preferably 2 to 10, more preferably 2 to 7, most preferably 7; p is an integer of from 1 to 15, preferably 1 to 10, more preferably 5 to 10, most preferably 7; q is an integer of from 1 to 15, preferably 1 to 10, more preferably 1 to 5, most preferably 3; t is an integer of from 1 to 15, preferably 1 to 10, more preferably 1 to 5, most preferably 3; A is independently selected from hydrogen or $C_1$–$C_6$ alkyl, preferably all being hydrogen; B is a suitable spacer group which does not contain carbodiimide groups, preferably being an ether or ester spacer group; E and E' are hydrogen or an alkyl group such as a $C_{1-10}$ alkyl group, preferably $CH_3$, and may be the same or different; G is an optional spacer group which does not contain a carbodiimide group, such as g'—N(g)— wherein g is selected from hydrogen and an alkyl group and g' is selected from a bond and a $C_1$–$C_6$ alkyl group; R, R' and R" are independently selected from arylene, substituted arylene, biarylene alkylene and substituted biarylene alkylene; and Z is an alkyl group such as a $C_{1-6}$ alkyl group, preferably $CH_2CH_2$, and may be the same or different.

According to a third aspect of the present invention there is provided an aqueous dispersion of an aromatic carbodiimide of the second aspect of the invention.

According to a fourth aspect of the present invention there is provided a water dispersable, polyether-terminated aromatic polycarbodiimide.

According to a fifth aspect of the present invention there is provided a process for preparing an aromatic polycarbodiimide as defined in any one of the preceding claims comprising reacting an aromatic isocyanate, preferably a polyisocyanate more preferably an aromatic diisocyanate, which may be the same or different, with a suitable reactant to form the aromatic polycarbodiimide.

An advantage of the present invention is that the aromatic polycarbodiimides are relatively non-toxic.

A further advantage is that the cross-linking process is much slower than that of the prior art aliphatic carbodiimide systems. It is believed that the crosslinking process may be approximately fifty times slower. The cross-linking process is slow enough for substantially all of it to occur during or after film formation with the result that a number of important requirements for a good coating, such as mar resistance, are greatly improved. The crosslinking is also fast enough to be useful in an ambiently cured film in a typical industrial or architectural use.

Further advantages of the present invention are that the water solubility of the aromatic polycarbodiimides can be tailored to suit individual needs, for example by incorporating surfactant groups. Also, the compatibilty of the aromatic polycarbodiimides with specific polymer (or resin) systems can be tailored to suit individual needs, for example by incorporating suitable compatibilising groups. For example, pendent or terminal phenyl groups make the aromatic polycarbodiimides suitable for use with polyester based polymers; whereas pendant or terminal polyether groups make the aromatic polycarbodiimides suitable for use with acrylic polymers.

The present invention therefore rests in the discovery and recognition of a new use of aromatic polycarbodiimides as well as in the preparation of new aromatic polycarbodiimides. In this regard, even though certain aromatic polycarbodiimides (i.e. wherein both r and r' of r—N=C=N—r' are aromatic groups) are known from publications such as U.S. Pat. No. 5,126,422, EP-B-0,231,509, U.S. Pat. No. 3,450,562, and U.S. Pat. No. 2,941,983, none of them falls within the scope of the above claims. Moreover, none of those documents specifically suggests or reports the use of aromatic polycarbodiimides as cross-linkers. The same is true for U.S. Pat. No. 4,612,054 which discloses carbodiimide driers for resin coating compositions. Whilst the general formula presented for the polycarbodiimide could cover an aromatic polycarbodiimide, there is no specific mention of, let alone a technical teaching for, both the use of the aromatic polycarbodiimides as cross-linkers and an aromatic polycarbodiimide according to the present invention.

The aromatic polycarbodiimide according to the present invention is water-soluble or readily emulsifiable in the presence of water. In particular, the aromatic polycarbodiimide is very effective as a cross-linking agent for carboxyl-containing, water borne polymers or resins (e.g. emulsion-polymerized acrylic polymer). The carboxyl-containing polymers may be totally or partially neutralised with a suitable base. The polycarbodiimide is also an effective crosslinking agent for other polymers based on epoxides, polyesters, and polyurethanes. In theory, the aromatic polycabodiimides according to the present invention may be used as a cross-linker in any water-borne or solvent-borne thermoset coating application.

Preferably, in the method of this invention, the aromatic polycarbodiimide comprises at least one pendant or terminal group for compatibilising the aromatic polycarbodiimide with a polymer in or as the coating formulation, preferably wherein the polymer is an acrylic polymer and preferably wherein the compatibilising group is an ether group.

Optionally, in the method of this invention, the aromatic polycarbodiimide comprises at least two aromatic carbodiimide groups separated by a spacer group, preferably the spacer group comprises at least one ether or ester group.

Preferably, in the method of this invention, the aromatic polycarbodiimide includes at least one substituted arylene group, preferably being derived from an aromatic polyisocyanate.

Preferably, in the method of this invention, the aromatic polycarbodiimide has from 4 to 10 aromatic carbodiimide groups, preferably about 5 to 7 groups. More preferably, the aromatic polycarbodiimide has about 7 carbodiimide groups.

Preferably, in the method of this invention, the aromatic polycarbodiimide has the general formula

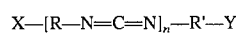

wherein X is a terminal group; Y is an optional terminal group; R and R' are independently selected from arylene, substituted arylene, biarylene alkylene and substituted biarylene alkylene; and n is an integer greater than 1.

Preferably, in the method of this invention, each of R and R' is derived from an aromatic polyisocyanate, which may be the same or different, preferably an aromatic diisocyanate such as toluene diisocyanate, naphthalene diisocyanate and diphenylmethane 4,4'-diisocyanate, most preferred is toluene diisocyanate.

Preferably, X or Y is a compatibilising group for an acrylic polymer. Preferably both X and Y are groups containing ether linkages which may be the same or different. Preferably, X and Y are similar groups containing ether linkages.

Optionally, in the use, the aromatic polycarbodiimide has the general formula as defined above for the second aspect according to the present invention. Preferably, q×t, the product of q and t, is from 4 to 10, preferably from 6 to 9, more preferably 9.

Preferably, in the above general formulae for the aromatic polycarbodiimide, m is about 7 and/or n is about 7 and/or p is about 7 and/or q is about 3 and/or t is about 3 and/or A is hydrogen and/or R, R' and R" are independently selected from arylene, substituted arylene, biarylene alkylene and substituted biarylene alkylene and/or Z is $CH_2CH_2$ and/or q×t is about 9. Preferably, each of R, R' and R" is the residue of an aromatic polyisocyanate, which may be the same or different, preferably an aromatic diisocyanate. B may be an ether group such as —O—(—$CH_2CH_2O$)$_{1-6}$— or an ethoxy group with pendant ester groups such as —O—CH{C(O)OCH$_3$}—CH{C(O)OCH$_3$}—O—.

Preferably, the aromatic polycarbodiimide has the following formula

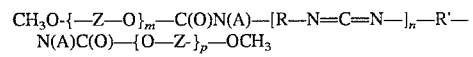

wherein m is 7; n is 7; p is 7; A is hydrogen; R and R' are substituted arylene; and Z is $CH_2CH_2$.

The aromatic polycarbodiimide may therefore have the following formula

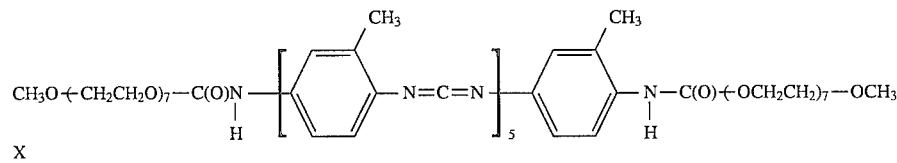

Another aromatic polycarbodiimide according to the present invention has the following formula

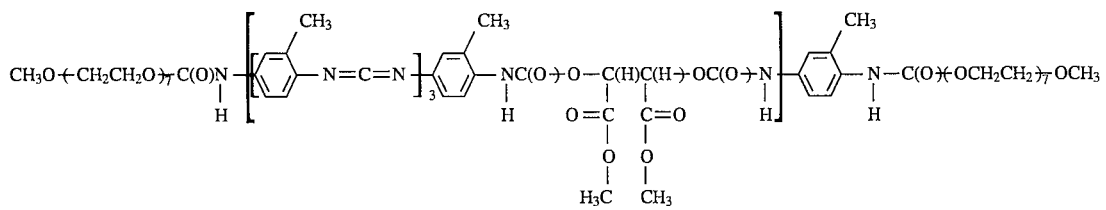

Preferably, the aromatic polycarbodiimides according to the present invention are prepared by polymerising aromatic mono-, di-, or tri-functional isocyanates.

Aromatic polycarbodiimides prepared by the condensation polymerization of diisocyanate with phospholene oxide catalyst are suseptible to thickening over the course of time. This thickening makes it increasingly difficult to prepare formulations containing the polycarbodiimide and eventually renders the product unusable for some purposes. It has been found that including certain stabilizers, in an amount effective to reduce the tendency of an aromatic polycarbodiimides to thicken, in the preparation of aromatic polycarbodiimides, extends their useful lifetime. Examples of such stabilizers include hindered phenols such as tetrakis(methylene 3-(3', 5'-di-tert-butyl-4'-hydroxyphenyl)proponate) methane (marketed as IRGANOX 1010; IRGANOX is a trademark of Ciba-Geigy Corp.) and 2,4-dimethyl-6-t-butyl phenol (marketed as AO-30 by Ciba-Geigy Corp.); and hindered nitroxyls such as 4-hydroxy-2,2,6,6-tetramethylpiperidinyl-1-oxy, or mixtures thereof.

The coating formulation may be free of organic solvent. Or the coating formulation may contain a coalescing solvent.

The coating formulation may contain typical coating additives such as binders, fillers, defoamers, other cross-linkers, catalysts, surfactants, stabilisers, anti-flocculants, pigments and suitable solvents, such as water-miscible solvents or even water. The coating may also contain typical additives that are used for the specific end purpose, such as a tackifier in adhesives.

The coating binder polymer (or resin) can be selected according to the criteria generally skilled in the art of coating compositions. Preferably, the coating comprises a polymer (or resin) prepared from at least one of the following monomers: an ethylenically-unsaturated monocarboxylic acid such as (meth)acrylic acid; an (meth)acrylic ester monomer including long chain (meth)acrylates, such as methyl (meth)acrylate, ethyl (meth)acrylate, propyl (meth)acrylate, isopropyl (meth)acrylate, butyl (meth)acrylate, isobutyl (meth)acrylate, secondary butyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, neopentyl (meth)acrylate, decyl (meth)acrylate, isodecyl (meth)acrylate, dodecyl pentadecyl (meth)acrylate, cetyl-eicosyl (meth)acrylate, isodecyl (meth)acrylate, lauryl (meth)acrylate, bornyl (meth)acrylate, isobornyl (meth)acrylate, myristyl (meth)acrylate, pentadecyl (meth)acrylate, stearyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; (meth)acrylonitrile; a multi-ethylenically unsaturated monomer such as allyl (meth)acrylate, diallyl phthalate, 1,4-butylene glycol di(meth)acrylate, 1,6-hexanediol- di(meth)acrylate, trimethylolpropane tri(methyl)acrylate; an ethylenically-unsaturated dicarboxylic acid or half ester thereof or the anhydride thereof such as itaconic acid, fumaric acid, maleic acid, monomethyl itaconate, monomethyl fumarate, monobutyl fumarate, maleic anhydride; butylaminoethyl (meth)acrylate, di(methyl)aminoethyl (meth)acrylate; a monomer containing a a, b-unsaturated carbonyl functional groups such as fumarate, maleate, cinnamate and crotonate; or any other nonmentioned hydrophobic or hydrophilic polymerisable monomer.

The coating binder polymer contains at least two carboxylic acid groups. Preferably, the polymer has an acid number of from 5 to 100, preferably from 10 to 85, more preferably from 15 to 45, more preferably from 20 to 40.

Most preferably, the binder polymer is a stryene acrylic polymer, preferably with an acid number of from 10 to 85, more preferably from 15 to 45, more preferably from 20 to 40.

Preferably, the aromatic polycarbodiimide is a cross-linker for wood coatings, especially water-borne wood coatings. However, the aromatic polycarbodiimide can also be a cross-linker for maintenance coatings, metal primers and coatings, woven and nonwoven textile coatings, leather coatings, coil coatings, architectural coatings, mastics, sealants, caulks, board coatings, paper coatings, plastics coatings and adhesives.

The present invention therefore provides an aromatic polycabodiimide cross-linker which cross-links a coating formulation during or after film formation and so does not materially impair the quality of film formation.

The following examples are intended to illustrate aromatic polycarbodiimides and coatings containing the same to which this invention is directed. They are not intended to limit the invention as other applications of the invention will be obvious to those of ordinary skill in the art.

EXAMPLE A

Preparation of Aromatic Polycarbodiimides

EXAMPLE A1

Preparation of an aromatic polycarbodiimide with terminal phenyl groups ("PCD7")

Into a round bottomed flask equipped with a heating mantle, stirrer, thermometer, condenser and nitrogen sparge were placed 9.39 g phenyl isocyanate, 20.61 g toluene diisocyanate, 27.0 g amyl acetate and 3.0 g of a 10% solution by weight of 3-methyl-l-phenyl-2-phospholene-l-oxide in xylene. The mixture was heated to 140° C. for 0.5 hours, then cooled. The resulting crosslinker was 43.3% solids with an average theoretical functionality of 4.

EXAMPLE A2

Preparation of an aromatic polycarbodiimide with terminal groups derived from diethyl-3-hydroxyglutarate ("PCD6")

Into the apparatus of Example A1 were placed 21.1 g toluene diisocyanate and 8.2 g of diethyl-3-hydroxyglutarate. The mixture was heated to 75° C. for 7 hours, then cooled. 25.0 g of amyl acetate and 1.06 g of a 16% by weight solution of 3-methyl-1-phenyl-2-phospholene-1-oxide in xylene were added. The mixture was heated to 60° C. for 6 hours, then to 80° C. for an additional 2 hours, then cooled. The resulting cross-linker was 50% solids with a theoretical average functionality of 5.

EXAMPLE A3

Preparation of an aromatic polycarbodiimide having methylether terminated polyethylene oxide end groups derived from Carbowax MPEG 350 ("PCD0")

Toluene 2,4-diisocyanate (17.1 g, 0.098 moles) was treated with the poly(ethylene glycol) monoethyl ether Carbowax 350 (supplied by Union Carbide) (Carbowax 350, 11.5 g, 0.033 moles, mole ratio diisocyanate/Carbowax=3/1) in a 100 ml round bottomed flask equipped with a thermometer, magnetic stirrer and a condenser with an attached bubbler. The mixture was stirred and heated to 75° C. for 1 hour to complete the alcohol-isocyanate reaction. The mixture was then cooled and 25 g amyl acetate solvent was added, followed by 0.83 g of a 16% wt solution of 3-methyl-l-phenyl-2-phospholene-l-oxide cataylst in xylene (0.133 g of catalyst, 0.7 mole % on diisocyanate). The mixture was stirred and heated to 60° C. for 2 hours and then 80° C. for 4.5 hours. The progress of the reaction was followed by loss in weight due to carbon dioxide evolution. The reaction was judged complete when the observed weight loss matched the calculated value. The product contained 50% solids in amyl acetate.

The calculated average number of carbodiimide linkages per polycarbodiimide chain is five.

EXAMPLE A4

Use of hindered phenol stabilizer with an aromatic polycarbodiimide having methylether terminated polyethylene oxide end groups derived from Carbowax MPEG 350

Toluene 2,4-diisocyanate (79.3 g, 0.456 moles) and poly(ethylene glycol) monoethyl ether Carbowax 350 (supplied by Union Carbide) (Carbowax 350, 38.5 g, 0.11 moles) was stirred and heated to 75° C. for 1 hour. 100 g. propylene glycol methyl ether acetate was added, followed by 6.1 g of a 10% wt solution of 3-methyl-1-phenyl-2-phospholene-l-oxide cataylst in xylene. The mixture was stirred and heated to 120° C. for 2 hours, during which time 17.6 g. loss in weight occurred due to carbon dioxide evolution. A 5 g. sample of final product was placed in a sealed vial in a 70 C. oven and checked periodically; after 3 days the mixture had gelled to a clear immobile mass.

Toluene 2,4-diisocyanate (19.8 g, 0.114 moles), poly(ethylene glycol) monoethyl ether Carbowax 350 (supplied by Union Carbide) (Carbowax 350, 9.6 g, 0.027 moles) and 0.05 g. (1000 ppm. based on the weight of final product) hindered phenol (IRGANOX 1010) was stirred and heated to 75° C. for 1 hour. 25 g. propylene glycol methyl ether acetate was added, followed by 1.53 g of a 10% wt solution of 3-methyl-l-phenyl-2-phospholene-l-oxide cataylst in xylene. The mixture was stirred and heated to 120° C. for 2 hours, during which time 4.4 g. loss in weight occurred due to carbon dioxide evolution. A 5 g. sample of final product was placed in a sealed vial in a 70 C. oven and checked periodically; after 6 days the mixture had gelled to a clear immobile mass.

Hindered phenol stabilizer prolonged the useful life of an aromatic polycarbodiimide of this invention.

EXAMPLE A5

Preparation of an aromatic polycarbodiimide having methylether terminated polyethylene oxide end groups derived from Carbowax MPEG 350

Toluene 2,4-diisocyanate (205.2 g, 1.179 moles) was treated with poly(ethylene glycol) monoethyl ether Carbowax 350 (supplied by Union Carbide) (Carbowax 350, 138.0 g, 0.394 moles, mole ratio diisocyanate/Carbowax=3/1) in a 1 liter round bottomed flask equipped with a thermometer, magnetic stirrer, condenser, and attached wet test meter. The mixture was stirred and heated to 75° C. for 1 hour to complete the alcohol-isocyanate reaction. The mixture was then cooled and 300 g propylene glycol methyl ether acetate was added. A 20 cc./min. nitrogen sparge through the reactor contents was then established and the mixture heated to 120 C. At 120 C., 4.44 g of a 10% wt solution of 3-methyl-1-phenyl-2-phospholene-1-oxide cataylst in xylene (0.44 g of catalyst, 0.175 mole % on diisocyanate) was added via a dropping funnel. After an initial exotherm, the mixture was stirred for 2 hours at 120 C. The progress of the reaction was followed by observing the volume of carbon dioxide evolved, obtained from the wet test meter reading after correction for the amount of nitrogen sparged. The product contained 50% solids in propylene glycol methyl ether acetate. The calculated average number of carbodiimide linkages per polycarbodiimide chain is five.

EXAMPLE B

Preparation of Coating Samples

The following series of coating samples according to the present invention were prepared.

| REF | RESIN | AROMATIC POLYCARBODIIMIDE CROSS-LINKER |
|---|---|---|
| IA.1 | Crylcoat 2680 | PCD7 |
| IA.2 | Styrene/acrylic resin; Acid No. = 65.1 | PCD6 |
| IA.3 | Styrene/acrylic polymer; Acid No. = 97.7 | PCD0 |
| IA.4 | Styrene/acrylic polymer; Acid No. = 48.8 | PCD0 |
| IA.5 | Styrene/acrylic polymer; Acid No. = 32.6 | PCD0 |

The following series of control samples were prepared:

| REF | RESIN | ALIPHATIC POLYCARBODIIMIDE CROSS-LINKER |
|---|---|---|
| CP.1 | Crylcoat 2680 | Ucarlnk XL-20 |
| CP.2 | Styrene/acrylic resin; Acid No. = 65.1 | Ucarlnk XL-27HS |
| CP.3 | — | |
| CP.4 | Styrene/acrylic polymer; Acid No. = 48.8 | Ucarlnk-25SE |
| CP.5 | — | |

| REF | RESIN | AZIRIDINE CROSS-LINKER |
|---|---|---|
| CA.1 | Crylcoat 2680 | XAMA-7 |
| CA.2 | Styrene/acrylic resin; Acid No. = 65.1 | XAMA-7 |
| CA.3 | Styrene/acrylic polymer; Acid No. = 97.7 | XAMA-7 |
| CA.4 | Styrene/acrylic polymer; Acid No. = 48.8 | XAMA-7 |
| CA.5 | — | |

As a final series of controls the above resins were tested without the presence of any cross-linker. These further control samples are listed as follows:

| REF | RESIN |
|---|---|
| CC.1 | Crylcoat 2680 |
| CC.2 | Styrene/acrylic resin; Acid No. = 65.1 |
| CC.3 | Styrene/acrylic polymer; Acid No. = 97.7 |
| CC.4 | Styrene/acrylic polymer; Acid No. = 48.8 |
| CC.5 | Acrylic emulsion polymer; Acid No. = 32.6 |

(Crylcoat 2680 (CC.1) is an aromatic polyester (solid) supplied by UCB with an Acid No.=50.8. CC.2 is a solvent-borne polymer; CC.3 is a dispersion of polymer in water; CC.4 is an emulsion-polymerized polymer; CC.5 is an acrylic emulsion polymer. Ucarlnk XL-20, XL-27HS and XL-25SE are all aliphatic polycarbodiimides and are supplied by Union Carbide. XAMA-7 is supplied by EIT Inc.)

These coating samples were formulated as follows. Generally, the order of mixing went from left to right (the quantities are given in grams.)

DFT (dried film thickness). For the wooden panels the films were air sprayed for a 0.0025 cm (1 mil) DFT seal coat and a 0.0025 cm (1 mil) DFT topcoat. The films were typically air dried for 1 week prior to testing. The samples were then tested according to the following established test procedures.

EXAMPLE D

Test Procedures

D1. MAR RESISTANCE TEST

This test measures the extent of damage done to an organic coating when it is struck with a finger nail. In this test, panels are coated with samples and then cured. The cured samples are then tested for mar resistance by two methods.

The first method ("surface mar") includes striking the coating vigorously several times with the back of a fingernail. The second method ("dig-in mar") includes trying to dig the finger nail into the coating. Each coating is then rated for each method on a scale from 0 to 10 with 10=no mark.

| REF | RESIN | N-METHYL PYRROLIDONE | PCD7 | UCARLNK XL-20 | XAMA-7 50% IN PM ACETATE |
|---|---|---|---|---|---|
| CC.1 | .625 | 1.875 | | | |
| IA.1 | .625 | 1.875 | .21 | | |
| CP.1 | .625 | 1.875 | | .20 | |
| CA.1 | .625 | 1.875 | | | .17 |

| REF | RESIN | BUTYL CELLO-SOLVE | TOLUENE | PCD6 | UCARLNK XL-27HS 66.7% IN PM ACETATE | XAMA-7 50% IN PM ACETATE |
|---|---|---|---|---|---|---|
| CC.2 | 1.35 | .14 | 1.01 | | | |
| IA.2 | 1.35 | .14 | 1.01 | .43 | | |
| CP.2 | 1.35 | .14 | 1.01 | | .39 | |
| CA.2 | 1.35 | .14 | 1.01 | | | .26 |

| REF | RESIN | WATER | 14% NH$_3$ | PCD0 | XAMA-7 (50% IN PM ACETATE) |
|---|---|---|---|---|---|
| CC.3 | 7.0 | 2.7 | .30 | | |
| IA.3 | 7.0 | 4.7 | .30 | 2.68 | |
| CA.3 | 7.0 | 2.7 | .30 | | 1.32 |

| REF | RESIN | H$_2$O | 14% NH$_3$ | BUTYL CELLO-SOLVE | BUTYL CARBITOL | PCD0 | UCARLNK 25SEIN | XAMA7 (50 PM ACETATE) | FLUORAD FC135 1% IN H$_2$O |
|---|---|---|---|---|---|---|---|---|---|
| CC.4 | 8.19 | .40 | .02 | 1.31 | .14 | | | |
| IA.4 | 8.19 | 1.6 | .02 | 1.31 | .14+e,cir +ee ·A | | 1.2 | .15 |
| CP.4 | 8.19 | .40 | .02 | 1.31 | .14 | 1.19 | | |
| CA.4 | 8.19 | .40 | .02 | 1.31 | .14 | | .59 | |

| REF | RESIN | H$_2$O | 14% NH$_3$ | BUTYL CELLO-SOLVE | BUTYL CARBITOL | PCD0 | FLUORAD FC-135 1% IN H$_2$O |
|---|---|---|---|---|---|---|---|
| CC.5 | 77.19 | 15.44 | 1.1 | 4.71 | 1.57 | | |
| IA.5 | 77.19 | 15.44 | 1.1 | 4.71 | 1.57 | 4.36 | 1.54 |

(BUTYL CELLOSOLVE is ethylene glycol monobutyl ether sold by Union Carbide. BUTYL CARBITOL is diethylene glycol monobutyl ether sold by Union Carbide. PM ACETATE is propylene glycol monomethylether acetate sold by ICI Americas. FLUORAD is a wetting agent sold by 3M Corp.)

EXAMPLE C

Preparation of Coating Films for Testing

Films of the prepared coating samples were either cast on aluminium panels or sprayed onto wooden panels. For the aluminium panels the films were cast for a 0.0025 cm (1 mil)

The results are reported as two values (x/y) corresponding to ratings for each respective method. An improvement of 1 is an important advantage.

D2. MEK RUB RESISTANCE TEST

This test measures the extent of damage done to a coating on a panel when exposed to methyl ethyl ketone (MEK). In this regard, a cheese cloth is first saturated with MEK. Then, by use of a Crockmeter (Atlas Electric Devices Inc.) the cloth is rubbed on the coating on the panel. In the test, two values (x/y) are recorded. The first is when breakthrough to the panel is first observed. The second is when there has been 80% coating film damage. The data are reported as double rubs (one set of back and forth). The higher the number of rubs, the better the coating film.

D3. SWARD HARDNESS TEST

This test follows the procedure laid down in ASTM designation D 2134-66 (Reapproved 1980), except that the film is not softened with a plasticiser. In short, a weighted wheel rocks like a pendulum on a coating film on a panel. In the test, one measures the number of swings before the motion is dampened by a certain amount. The higher the number of swings, the harder the film.

D4. PENCIL HARDNESS TEST

This test is a rapid and inexpensive determination of the film hardness of an organic coating on a substrate in terms of drawing leads or pencil leads of known hardness. The test is laid out in detail under ASTM designation D 3363-74 (Reapproved 1980). In short, a panel is coated and cured and then tested for pencil hardness using a mechanical holder. Lead of varying hardness was flattened on the end and then pressed against the coating at a 45° angle until either the lead broke or a cut was made through the coating to the substrate. The coating hardness is rated by the hardest lead which does not tear the coating, according to the following chart in order of increasing hardness: 6B, 5B, 4B, 3B, 2B, B, HB, F, H, 2H, 3H, 4H, 5H, 6H, 71H, 8H.

D5. KNOOP HARDNESS TEST

This test is a measure of the indentation hardness of organic materials such as paint when applied to an acceptable plane rigid surface of a panel. The test is laid out in detail under ASTM designation D 1474-85. In short, a 25 gram load is placed on the dried film by use of a diamond stylus. The indentation left on the film by the diamond stylus is measured under a microscope. The smaller the measured indentation, the harder the coating film.

D6. HOT PRINT TEST

This test measures the hardness of a coating film by measuring the extent of an imprint of a weighted cheesecloth. In this test, a sample is coated on a panel and cured. A piece of cheesecloth is then placed over the coated side of the panel and held at 60° C. (140° F.) for 4 hours at 1406 $kgm^{-2}$ (2 pounds/square inch pressure). The cheesecloth is then removed. The coating is then inspected to see whether there is an imprint of the cheesecloth. The coating is then rated on a scale from 0–10 where 0=can not move the cheese cloth and 10=no printing.

D7. COMPOSITE STAIN TEST

This test measures the extent of staining of a coating film on a panel after being exposed to a stain solution. The stains for the composite stain were water, 50% EtOH, 1% Dreft, Formula 409, vinegar and 7% $NH_3$. The stain agents were in contact with the film for 16 hours and were covered to prevent evaporation. Each stain is done seperately and the results averaged. The data is presented as initial rating/rating after 24 hours recovery. The data is recorded on a scale of 0–10 wherein 10 is best.

D8. ACETONE OR DMF SPOT TEST

This test is similar to the Composite Stain test except that the stain solution is acetone or DMF (dimethylformamide) and the film is exposed for just either 10 minutes or 1 hour. The data are presented showing the two respective values.

The following results show that the aromatic polycarbodiimides according to the present invention display properties, such as mar resistance and MEK rubs, that are both better than the prior art aliphatic polycarbodiimides and at least comparable to the toxic aziridine cross-linkers.

EXAMPLE 1 Substrate: Aluminium

| SAMPLE: | CC.1 | IA.1 | CP.1 | CA.1 |
|---|---|---|---|---|
| PROPERTY | | | | |
| Mar Resistance | 2/1 | 5/3 | 2/1 | 4/3 |
| MEK Rubs | 1/1 | 10/15 | 2/3 | 25/35 |
| Pencil Hardness | 3B | B | B | HB |
| Sward Hardness | 10 | 25 | 18 | 15 |

EXAMPLE 2 Substrate: Aluminium

| SAMPLE: | CC.2 | IA.2 | CP.2 | CA.2 |
|---|---|---|---|---|
| PROPERTY | | | | |
| Mar Resistance | 1/1 | 4/3 | GELLED | 4/3 |
| MEK Rubs | 2/2 | 5/10 | GELLED | 30/80 |
| Sward Hardness | 22 | 34 | GELLED | 32 |
| Knoop Hardness | 0.9 | 5.2 | GELLED | 2.0 |

EXAMPLE 3 Substrate: Aluminium

| SAMPLE: | CC.3 | IA.3 | CA.3 |
|---|---|---|---|
| PROPERTY | | | |
| Mar Resistance | 2/1 | 5/4 | 6/5 |
| MEK Rubs | 5/5 | 35/60 | >500/>500 |
| Sward Hardness | 55 | 56 | 55 |
| Knoop Hardness | 4.6 | 8.4 | 9.5 |
| Hot Print | 1 | 5 | 8 |
| Composite Stains | 0/1 | 4.5/5 | 7.5/9 |

EXAMPLE 4 Substrate: Aluminium

| SAMPLE: | CC.4 | IA.4 | CP.4 | CA.4 |
|---|---|---|---|---|
| PROPERTY | | | | |
| Mar Resistance | 3/2 | 4/3 | 2/1 | 4/3 |
| MEK Rubs | 5/5 | 25/60 | 10/25 | 150/>500 |
| Hot Print | 2 | 4 | 3 | 4 |

EXAMPLE 5 Substrate: Cherry Veneer

| SAMPLE: | CC.5 | IA.5 |
|---|---|---|
| PROPERTY | | |
| Mar Resistance | 3/2 | 4/4 |
| Hot Print | 4 | 7 |
| Composite Stains | 2/5.5 | 7/8 |
| 10 min AST | 7/6 | 8/8 |
| 1 hr AST | 4/4 | 7/7 |

(AST = Acetone Spot Test)

EXAMPLE 6

Crosslinking polyurethane dispersion with aromatic carbodiimide

Coating compositions containing an polyurethane dispersion bearing at least two carboxylic acid groups were prepared by adding the ingredients presented in Table 6.1 with mixing, in the order given

TABLE 6.1

Preparation of polyurethane dispersion compositions

| Coating composition: | 6-1 | 6-2 | 6-3 | 6-4 |
|---|---|---|---|---|
| Polyurethane dispersion (SANCURE 825) | 25.0 | 25.0 | 25.0 | 25.0 |
| Water | 1.5 | 9.1 | 3.05 | — |
| Aziridine (XAMA-7) | 0.75 | — | — | — |
| Aliphatic carbodiimide (UCARLINK XL-29SE) | — | 4.1 | — | — |
| Aromatic polycarbodiimide (EXAMPLE A.5) | — | — | 3.05 | — |

Coating compositions 6-1 to 6-4 were drawn down on an Aluminum panel at a dry film thickness of 1 mil and air-dried. Test results are presented in Table 6.2

TABLE 6.2

Testing of cured polyurethane dispersion compositions

| Coating composition: | 6-1 | 6-2 | 6-3 | 6-4 |
|---|---|---|---|---|
| Sward Hardness | 28 | — | 29 | 28 |
| 1 hr. AST | 8/8 | 6/7 | 8/8 | 7/7 |
| 1 hr. DMF spot test | 8/10 | 1/1 | 8/9 | 2/3 |
| Composite stain test | 5/8 | 3/8 | 5/9 | 3/5 |

Coating composition 6-3 of this invention exhibits cured coating properties superior to the uncured dispersion (6-4); and improved coating properties on balance relative to comparative coatings 6-1 and 6-2.

EXAMPLE 7

Crosslinking a styrenated acrylic latex with an aromatic carbodiimide for use as an exterior hardboard primer.

An exterior primer was prepared by blending with mild agitation 5.29 g. of triethylamine-neutralized acrylic pigment dispersant ( 23.7% solids ACRYSOL I-62; ACRYSOL is a trademark of Rohm and aas Co., 12.5 g. deionized water, and 0.45 g. defoamer (BALAB 3056A; BALAB ids a trademark of Witco Chem. Co.). The mixture was then poured into a Cowles dispersed with strong agitation. The following pigments were then mixed in: 10. g. titanium dioxide (TIPURE R-960; TIPURE is a trademark of Dupont Corp.), 44.2 g. silica (NEOSIL A; NEOSIL is a trademark of Tammsco Co.), 4 g. clay (ASP-400; Englehard Co.), 0.1 g. bentonite (BENTON LT; BENTON is a trademark of NL Industries, and 0.1 g. Aurasperse W-7012 (Harshaw Corp.). The fineness of grind was measured to be 6–7 Hegman. The resulting mixture was then blended with 49.7 g. styrenated acrylic latex bearing at least two carboxylic acid groups (45.2% solids; polymer containing 8% methacrylic acid), 12.7 g. aromatic carbodiimide (50% solids; Example A.5), 0.6 g. rheology modifier (ACRYSOL RM-825: ACRYSOL is a trademark of Rohm and Haas Co.), and 18.4 g. deionized water.

The coating composition was applied on X-90 hardboard (composite wood product of Masonite Corp.) at a wet thickness of 8 mils and cured for 2.5 min. at room temperature, then 3.0 min. at 300 F., and then 3.5 min. at 405 F. in a convection oven. The board surface temperature immediately on removal from the oven was 325 F. The coating was tested and had 178 MEK rubs and good block resistance with no wax migration.

EXAMPLE 8

Crosslinking an acrylic latex with an aromatic carbodiimide for use as a binder for a nonwoven fabric.

Preparation of Sample 8. To 152.6 g. acrylic latex bearing at least two carboxylic acid groups (48.2 ethyl acrylate/48.2 butyl acrylate/3.6 methacrylic acid) was added 328 g. water and 4.6 g. ammonia. Then 4.75 g. aromatic polycarbodiimide (50% solids content; Example A.5) was diluted with 10 g. water and stirred into the diluted latex. The final formulation solids content of the binder composition was 9%. A comparative sample was prepared except for the deletion of the aromatic polycarbodiimide.

A DACRON 730W (DACRON is a trademark of DuPont Co.) polyester nonwoven, 1.5 denier, 1.5 inch staple length, merge 613-D3H, nonwoven web, nominally 1 oz./sq. yd., thermally prebonded was used for tensile test and drape flex testing. A carded nonwoven web of DACRON 371W fibers, nominally 1 oz./sq. yd. which was not heat bonded was used for wash durability and dryclean testing. Webs were supported between fiberglass scrim, saturated with the binder composition, and passed through a Birch Bros. padder at 40 psig. The fiberglass scrim was removed and each web placed in a Mathis oven at 150 C. for 5 min. to dry and cure the binder composition.

Tensile Testing. Samples were tested dry and wet after soaking for 30 min. in a 0.1% TRITON X-100 (TRITON is a trademark of Union Carbide Corp.) solution in water ("water-wet"), isopropanol, or perchloroethylene (DOWPER CS; DOWPER is a trademark of Dow Chemical Co. ("perchlor-wet"). For each evaluation, as presented in Table 8.1, five samples were cut from each of two replicate webs and the average reported.

TABLE 8.1

Tensile testing of nonwoven webs containing acrylic binder crosslinked with aromatic polycarbodiimide.

| | Tensile Strength (g./in.) | | | |
|---|---|---|---|---|
| Sample | Dry | Water-wet | Isopropanol wet | Perchlor-wet |
| 8 | 2009 | 1327 | 671 | 707 |
| Comparative | 1010 | 501 | too weak | too weak |

Wash Durability Samples of bonded nonwoven 9 inches by 10 inches were cut from the web which had not been thermally prebonded. Thery were washed in a home washing machine, full cycle wash, "hot" (50–60 C. ) water, ½ cup of TIDE ULTRA powder (TIDE is a trademark of Procter and Gamble), and eight terry cloth towels. At the end of each cycle, fabrics were examined and were rated as failed if they had split into more than one piece or had roped. Results are presented in Table 8.2.

Fabric Stiffness. ASTM D 1388 Stiffness of Fabrics, Option A—Cantilever Test (Drape Flex), FRL Cantilever Bending Tester (Testing Machines Inc., Amityville, N.Y., motor-driven, constant rate, was used. The average of six samples bent across fabric machine direction is reported in Table 8.2

TABLE 8.2

Wash and Drape-flex testing of nonwoven webs containing acrylic binder crosslinked with aromatic polycarbodiimide.

| Sample | Washes Survived | Drape-flex (mm.) |
|---|---|---|
| 8 | >85 | 87 |
| Comparative | 11 | 72 |

Sample 8 of this invention exhibits superior performance as a nonwoven fabric binder relative to the comparative sample.

EXAMPLE 9

Crosslinking an acrylic latex with an aromatic carbodiimide for use as a binder for a leather basecoat.

Preparation of Comparative 9. To 59 g. of an acrylic emulsion polymer bearing at least two carboxylic acid groups was added 12 g. of a clay dispersion (LA Neutral from Rohm and Haas Co.), 8 g. of a wax dispersion (PRIMAL C-7; PRIMAL is a trademark of Rohm and Haas Co.), and 21 g. of a pigment dispersion (LA Black P from Rohm and Haas Co.).

Preparation of Samples 9-1 and 9-2. Aromatic polycarbodiimide (Example A.5) was added to the acrylic emulsion of Comparative 9 and mixed well before adding the other ingredients. In sample 9-1, 3.5 phr. aromatic polycarbodiimide was used; in sample 9-2, 7.0 phr. aromatic polycarbodiimide was used.

Comparative 9 and Samples 9-1 and 9-2 were sprayed onto split leather using a pressurized air spray gun.

Embossing. Embossing using a heated press at 110 C. was used to imprint patterns into the coated leather. A tendency of the coated leather to cling to the opened press is rated; clinging is undesirable. Results are presented in Table 9.1

Bally Flex Test. The wet Bally flex test evaluates the ability of the coated leather to remain flexible while resisting the tendency of the leather fibers to punch through the finish from underneath. A dry Bally flex test is also run to evaluate the flexibility of the coating. Coated samples are run for 100,000 flexes, wet or dry. Results are presented in Table 9.1.

Block Test. The blocking tendency is evaluated on coating to coating contact for 1 hour at 275 F. under a 500 gram load. Results are presented in Table 9.1.

TABLE 9.1

Testing of base-coated leather

| | Comp. 9 | Sample 9-1 | Sample 9-2 |
|---|---|---|---|
| Embossing (plate cling) | moderate | very slight | none |
| Wet Bally Flex Appearance | sl. pinholes | no damage | no damage |
| Dry Bally Flex Appearance | sl. cracks | no damage | few cracks |
| Block Test (cling) | severe | moderate | slight |

Samples 9-1 and 9-2 of this invention exhibited superior performance as crosslinked coating binders for leather basecoats relative to comparative 9.

EXAMPLE 10

Crosslinking an acrylic/polyurethane blend with an aromatic carbodiimide for use as a binder for a leather topcoat.

Preparation of Comparative 10. To 120 g. water are added with mixing 50 g. ethylene glycol monobutyl ether, 30 g. of a levelling/flow agent (MA-65 from Rohm and Haas Co), 210 g. of an aqueous silica dispersion (PRIMAL Duller 6; PRIMAL is a trademark of Rohm and Haas Co.), 572 g. of a 71/29 blend of an acrylic emulsion polymer/polyurethane dispersion blend, each polymer bearing at least two carboxylic acid groups, 20 g. of a silicone emulsion (LA-2229 from Rohm and Haas Co.), and 45 g. of a thickener (ACRYSOL RM-1020; Acrysol is a trademark of Rohm and Haas Co.).

Preparation of Sample 10-1. To Comparative 10 was added 50 g. of aromatic polycarbodiimide (Example A.5) last, with mechanical mixing.

Comparative 10 and Sample 10-1 were sprayed onto basecoated leather using a pressurized air spray gun. The topcoated leather was dried at 120F for 5 minutes and then cured at room temperature for 16 hours. Prior to testing, after 12 hours, the topcoated leather was milled for 4 hours.

Wet Veslic Test. The Veslic testing machine (wet pad, 1 kg. load, cyclical rubbing action) was used to evaluate the water resistance of the topcoated leather. Data are presented in Table 10.1

TABLE 10.1

Testing of topcoated leather

| Sample: | Comparative 10 | Sample 10-1 |
|---|---|---|
| Wet Veslic Rating | 267 cycles; 10% damage | 1000 cycles; no damage |

Sample 10-1 of this invention exhibited superior performance as a crosslinked coating binder for leather topcoats relative to comparative 10.

EXAMPLE 11

Crosslinking an polyurethane dispersion with an aromatic carbodiimide for use as a binder for a leather topcoat.

Preparation of Comparative 11. A polyurethane dispersion polymer bearing at least two carboxylic acid groups, water, thickener and flow aids was used as a clear leather topcoat.

Preparation of Samples 11-1 and 11-2. To Comparative 11 was added 1.5%, based on polyurethane solids (Sample 11-1) or 3%, based on polyurethane solids (Sample 11-2) aromatic polycarbodiimide (Example A.5) last, with mechanical mixing before, during, and after the addition.

Comparative 101 and Samples 11-1 and 11-2 were sprayed onto basecoated leather using a pressurized air spray gun. The topcoated leather was dried at 120 F. for 5 minutes and then cured at room temperature for 24 hours.

Toothill Scuff Test. Scuff resistance of the topcoated leather was rated after 1000 cycles using the Toothill Scuff Tester.

Wet Veslic Test. As in Example 10

Block Test. Conditions were 300 F./2 psi./1 hour.

Wet Crock Test. Cycles passed using an AATCC Crockmeter with a 4 lb. load.

TABLE 11.1

| | Testing of topcoated leather | | |
|---|---|---|---|
| | Comp. 11 | Sample 11-1 | Sample 11-2 |
| Block Test (cling) | severe 100% damage | moderate 60% damage | moderate+ 70% damage |
| Toothill Scuff Test | poor | fair | fair |
| Wet Veslic Rating | 115 cycles | 155 cycles | 125 cycles |
| Wet Crock Test | 60 cycles | 350 cycles | 170 cycles |

Samples 11-1 and 11-2 of this invention exhibited superior performance as crosslinked polyurethane coating binders for leather topcoats relative to Comparative 11.

We claim:

1. A stabilized composition comprising an aqueous dispersion of an aromatic polycarbodiimide having the formula of either

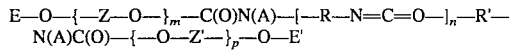

or

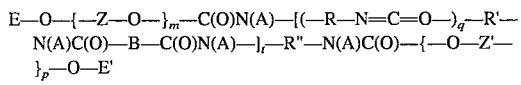

wherein m is an integer of from 5 to 10; n is an integer of from 2 to 7; p is an integer of from 5 to 10; q is an integer of from 1 to 5 and t is an integer of from 1 to 5, wherein the product of q and t is from 4 to 10; A is hydrogen; B is a group which does not contain carbodiimide groups; E and E' are $CH_3$; R, R', and R" are independently selected from arylene, alkyl-substituted arylene, biarylene alkylene, or alkyl-substituted biarylene alkylene; and Z and Z' are $C_1$–$C_6$ alkyl groups; and a stabilizer in an amount effective to enhance the stability of said polycarbodiimide, wherein said stabilizer is selected from the group consisting of hindered phenols, hindered nitroxyls, and mixtures thereof.

* * * * *

UNITED STATES PATENT AND TRADEMARK OFFICE
CERTIFICATE OF CORRECTION

PATENT NO. : 5,574,083
DATED : November 12, 1996
INVENTOR(S) : Ward Thomas Brown
James Clarence Day It is certified that error appears in the above-identified patent and that said Letters Patent is hereby corrected as shown below:

COLUMN 2, line 22 should read:

$$E\text{-}O\text{-}\{\text{-}Z\text{-}O\}_m\text{-}G\text{-}C(O)N(A)\text{-}[R\text{-}N\text{=}C\text{=}N\text{-}]_n\text{-}R'\text{-}N(A)C(O)\text{-}G\text{-}\{O\text{-}Z'\text{-}\}_p\text{-}O\text{-}E'$$

or $$E\text{-}O\text{-}\{\text{-}Z\text{-}O\text{-}\}_m\text{-}G\text{-}C(O)N(A)\text{-}[(R\text{-}N\text{=}C\text{=}N\text{-})_q\text{-}R'\text{-}N(A)C(O)\text{-}B\text{-}C(O)N(A)\text{-}]_t\text{-}R''\text{-}N(A)C(O)\text{-}G\text{-}\{O\text{-}Z'\text{-}\}_p\text{-}O\text{-}E'$$

COLUMN 4, line 62 should read:

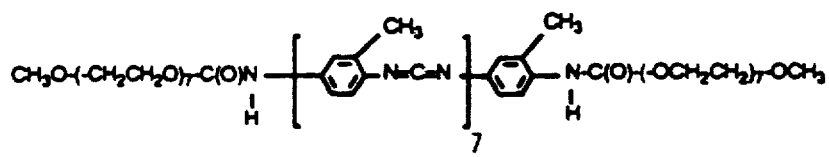

UNITED STATES PATENT AND TRADEMARK OFFICE
CERTIFICATE OF CORRECTION

PATENT NO. : 5,574,083
DATED : November 12, 1996
INVENTOR(S) : Ward Thomas Brown
James Clarence Day Page 2 of 2

It is certified that error appears in the above-identified patent and that said Letters Patent is hereby corrected as shown below:

COLUMNS 5 and 6: formula should read:

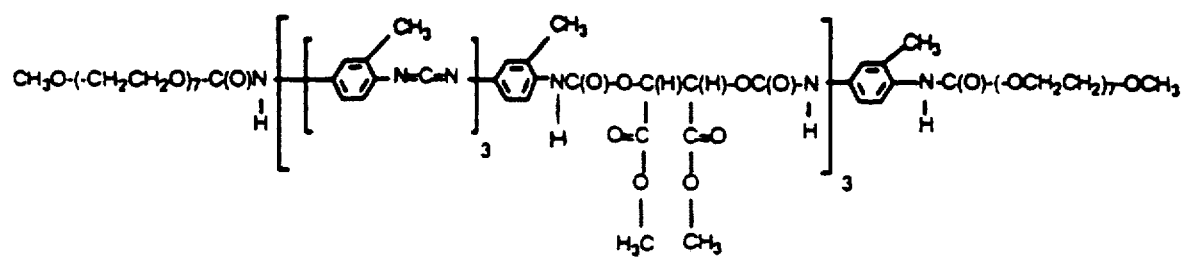

COLUMNS 17 and 18: formula should read:

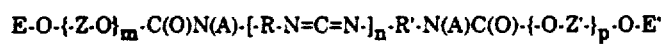

or

Signed and Sealed this

Thirtieth Day of December, 1997

*Attest:*

Bruce Lehman

BRUCE LEHMAN

*Attesting Officer*    Commissioner of Patents and Trademarks